US012267025B2

(12) United States Patent
Wang et al.

(10) Patent No.: US 12,267,025 B2
(45) Date of Patent: Apr. 1, 2025

(54) ENERGY GENERATION AND ENERGY RECYCLING

(71) Applicant: City University of Hong Kong, Kowloon (HK)

(72) Inventors: Steven Wang, Kowloon (HK); Hongbo Wang, Kowloon (HK)

(73) Assignee: City University of Hong Kong, Kowloon (HK)

( * ) Notice: Subject to any disclaimer, the term of this patent is extended or adjusted under 35 U.S.C. 154(b) by 1043 days.

(21) Appl. No.: 17/212,236

(22) Filed: Mar. 25, 2021

(65) Prior Publication Data
US 2022/0311359 A1    Sep. 29, 2022

(51) Int. Cl.
*H02N 1/04* (2006.01)
*H02N 3/00* (2006.01)
*H02N 10/00* (2006.01)

(52) U.S. Cl.
CPC ............... *H02N 1/04* (2013.01); *H02N 3/00* (2013.01); *H02N 10/00* (2013.01)

(58) Field of Classification Search
CPC ............. H02N 1/04; H02N 3/00; H02N 10/00
USPC ......................................................... 310/306
See application file for complete search history.

(56) References Cited

U.S. PATENT DOCUMENTS 10,401,876 B1 *  9/2019  Coleman .................. G05D 7/00

FOREIGN PATENT DOCUMENTS

EP    4142139 A1 *  3/2023  ............... H02N 1/04

OTHER PUBLICATIONS

Grand Illusions (https://www.youtube.com/watch?v=a_n7qxMX7Vk) (Year: 2016).*
J. Li, J. Li, J. Sun, S. Feng, and Z. Wang, Biological and Engineered Topological Droplet Rectifiers, Advanced Materials 31 (2019) 1806501.
M. Reyssat, F. Pardo, and D. Quéré, Drops onto Gradients of Texture, EPL (Europhysics Letters) 87 (2009) 36003.
N. Malvadkar, A., M. Hancock, J., K. Sekeroglu, W. Dressick, J., and M. Demirel, C., An Engineered Anisotropic Nanofilm with Unidirectional Wetting Properties, Nature Materials 9 (2010) 1023-1028.
K.-H. Chu, R. Xiao, and E. Wang, N., Uni-Directional Liquid Spreading on Asymmetric Nanostructured Surfaces, Nature Materials 9 (2010) 413-417.
T.A. Duncombe, E.Y. Erdem, A. Shastry, R. Baskaran, and K.F. Böhringer, Controlling Liquid Drops with Texture Ratchets, Advanced Materials 24 (2012) 1545-1550.
M. Liu, J. Li, X. Zhou, J. Li, S. Feng, Y. Cheng, S. Wang, and Z. Wang, Inhibiting Random Droplet Motion on Hot Surfaces by Engineering Symmetry-Breaking Janus-Mushroom Structure, Advanced Materials 32 (2020) e1907999-n/a.

(Continued)

*Primary Examiner* — Jose A Gonzalez Quinones
(74) *Attorney, Agent, or Firm* — Renner, Kenner, Greive, Bobak, Taylor & Weber

(57) ABSTRACT

An energy generation device Including: a surface for supporting movement of a work material, and an energy converter. The surface is operable to induce movement of the work material relative to the surface. The energy converter is arranged to generate electrical energy based on the induced movement of the work material relative to the surface.

23 Claims, 11 Drawing Sheets

(56) References Cited

OTHER PUBLICATIONS

B.A. Malouin, N.A. Koratkar, A.H. Hirsa, and Z. Wang, Directed Rebounding of Droplets by Microscale Surface Roughness Gradients, Applied Physics Letters 96 (2010).
J. Wu, R. Ma, Z. Wang, and S. Yao, Do Droplets Always Move Following the Wettability Gradient?, Applied Physics Letters 98 (2011) 204104.
H. Linke, B.J. Aleman, L.D. Melling, M.J. Taormina, M.J. Francis, C.C. Dow-Hygelund, V. Narayanan, R.P. Taylor, and A. Stout, Self-propelled Leidenfrost Droplets, Physical Review Letters 96 (2006) 154502.
G. Wang, J.R. McDonough, V. Zivkovic, T. Long, and S. Wang, From Thermal Energy to Kinetic Energy: Droplet Motion Triggered by the Leidenfrost Effect, Advanced Materials Interfaces (2020) 2001249.
G. Dupeux, P. Bourrianne, Q. Magdelaine, C. Clanet, and D. Quéré, Propulsion on a Superhydrophobic Ratchet, Scientific Reports 4 (2014).
G.G. Wells, R. Ledesma-Aguilar, G. Mchale, and K. Sefiane, A Sublimation Heat Engine, Nature Communications 6 (2015).
P. Agrawal, G.G. Wells, R. Ledesma-Aguilar, G. McHale, A. Buchoux, A. Stokes, and K. Sefiane, Leidenfrost Heat Engine: Sustained Rotation of Levitating Rotors on Turbine-Inspired Substrates, Applied Energy 240 (2019) 399-408.
J. Ok, E. Lopez-Oña, D. Nikitopoulos, H. Wong, and S. Park, Propulsion of Droplets on Micro- and Sub-Micron Ratchet Surfaces in the Leidenfrost Temperature Regime, Microfluidics and Nanofluidics 10 (2011) 1045-1054.
Á.G. Marín, D. Arnaldo del Cerro, G.R.B.E. Römer, B. Pathiraj, A. Huis in 't Veld, and D. Lohse, Capillary Droplets on Leidenfrost Micro-Ratchets, Physics of Fluids 24 (2012) 122001.
G. Dupeux, M. Le Merrer, G. Lagubeau, C. Clanet, S. Hardt, and D. Quéré, Viscous Mechanism for Leidenfrost Propulsion on a Ratchet, EPL (Europhysics Letters) 96 (2011) 58001.
T. Baier, G. Dupeux, S. Herbert, S. Hardt, and D. Quere, Propulsion Mechanisms for Leidenfrost Solids on Ratchets, Physical Review E 87 (2012) 021001.
T.R. Cousins, R.E. Goldstein, J.W. Jaworski, and A.I. Pesci, A Ratchet Trap for Leidenfrost Drops, Journal of Fluid Mechanics 696 (2012) 215-227.
C.T. Avedisian and J. Koplik, Leidenfrost Boiling of Methanol Droplets on Hot Porous/Ceramic Surfaces, International Journal of Heat and Mass Transfer 30 (1987) 379-393.
G. Lagubeau, M.L. Merrer, C. Clanet, and D. Quéré, Leidenfrost on a Ratchet, Nature Physics 7 (2011) 395-398.
B. Anne-Laure, C. Clanet, and D. Quéré, Leidenfrost Drops, Physics of Fluids 15 (2003) 1632-1637.
D. Quéré, Leidenfrost Dynamics, Annual Review of Fluid Mechanics 45 (2013) 197-215.
G. Dupeux, M. Le Merrer, C. Clanet, and D. Quéré, Trapping Leidenfrost Drops with Crenelations, Physical Review Letters 107 (2011) 114503.

* cited by examiner

ENERGY GENERATION AND ENERGY RECYCLING

TECHNICAL FIELD

The invention relates to an energy generation device and an energy recycling device.

BACKGROUND

Waste heat occurs in many mechanical and thermal processes, and is usually a by-product of the mechanical and thermal processes. Waste heat is typically released into the environment with a relatively low temperature (e.g., less than a few hundred degree Celsius), and as a result, is difficult to recover and utilize. There exists a need to develop technologies to recover waste heat, i.e., to convert waste heat into useful energy.

SUMMARY

In a first aspect, there is provided an energy generation device, comprising: a surface for supporting movement of a work material, and an energy converter. The surface is operable to induce movement of the work material relative to the surface. The energy converter is arranged to generate electrical energy based on the induced movement of the work material relative to the surface.

In one embodiment of the first aspect, the surface is operable to induce self-propel movement of the work material relative to the surface. The induction of the self-propel movement may be based on Leidenfrost effect, inverse Leidenfrost effect, etc.

In one embodiment of the first aspect, a direction of the induced movement of the work material is generally parallel to the surface. In one example, a predominant direction of the induced movement of the work material is generally parallel to the surface.

In one embodiment of the first aspect, the surface is arranged to be heated by a heat source to a temperature above an activation temperature so as to induce self-propel movement of the work material relative to the surface. The activation temperature may be at least 50 degree Celsius. The heat source may comprise a source of waste heat or low-grade heat. In one example, the waste heat may have a temperature of 50 degree Celsius to 500 degree Celsius. The waste heat may be of other temperature or temperature range.

In one embodiment of the first aspect, the surface comprises a treated surface that has been treated chemically and/or physically. The surface may be generally flat, or it may be a textured surface. The surface may be a metallic surface (e.g., aluminium), a hydrophobic or superhydrophobic surface (e.g., provided by a superhydrophobic coating).

In one embodiment of the first aspect, the surface is a ratcheted surface. The ratcheted surface may comprise a plurality of teeth extending across at least part of (e.g., an entirety of) a width of the ratcheted surface and corresponding groove arranged between adjacent teeth. At least some of (e.g., all of) the teeth may have the same size and/or shape. The teeth may have a cross-section that is asymmetric. For example, the cross-section of the teeth can be generally triangular or generally trapezoidal. The cross-section of the teeth may change across the width of the ratcheted surface. The teeth may be spaced substantially equally.

In one embodiment of the first aspect, the energy generation device further comprises a body defining a channel arranged to receive the work material, the channel comprising the surface. The surface may be arranged along the entire channel or only part of the channel. The channel may be straight or curved. The channel may be an endless channel, such as an annular endless channel. The channel may be fluidly connected with inlet and/or outlet of the work material (for adding and/or removing the work material from the channel). The energy generation device may further include a lid with one or more plates rotatably coupled to the body. The induced movement of the work material relative to the surface may cause the work material to engage (e.g., impact, push, apply force to, etc.) the one or more plates to rotate the lid relative to the body. The energy converter may be arranged to generate electrical energy based on the rotation of the lid relative to the body.

In one embodiment of the first aspect, the energy generation device further comprises a housing for containing the body. The housing may be additively manufactured (e.g., 3D printed).

In one embodiment of the first aspect, the energy generation device further comprises the work material. The work material may be in the form of a solid or fluid, and may change phase based on the environment in which it is arranged. The work material may comprise a work fluid, e.g., a work liquid. The work liquid may be in the form of liquid droplet(s), slug(s), or bulk-flow. The work material may include a magnetic material. For example, the work material comprises a solution containing magnetic materials such as magnetic particles (e.g., nanoparticles).

In one embodiment of the first aspect, the energy converter comprises a coil arrangement arranged to generate electrical energy (e.g., induced current, induced electromotive force/voltage) based on a changing magnetic field produced by the induced movement of the work material relative to the surface.

In one embodiment of the first aspect, the coil arrangement comprises a coil spiraling around the surface along a length of the surface. The coil may spiral around the entire length of the surface or only some of the length of the surface.

In one embodiment of the first aspect, the energy converter comprises a transducer arranged to convert kinetic energy associated with the induced movement of the work material relative to the surface into electrical energy. The transducer may comprise a piezoelectric transducer, such as a cantilevered piezoelectric transducer.

In one embodiment of the first aspect, the energy converter may include both the coil arrangement and the transducer.

In one embodiment of the first aspect, the energy generation device further comprises an electrical energy storage operably connected with the energy converter to store the electrical energy generated by the energy converter. The electrical energy storage may comprise an electrical energy storage circuit. The electrical energy storage circuit may comprise a capacitor.

In one embodiment of the first aspect, the energy generation device further comprises an interface electrically connected with the energy converter and arranged to be connected with a load to provide the electrical energy generated by the energy converter to the load. The load can be any electrical device.

In one embodiment of the first aspect, the energy generation device is an energy recycling device.

In one embodiment of the first aspect, the energy generation device is a portable device.

In a second aspect, there is provided an energy recycling device comprising a first energy converter arranged to convert heat obtained from a heat source into induced movement of a work material relative to a surface; and a second energy converter arranged to generate electrical energy based on the induced movement of the work material relative to the surface.

In one embodiment of the second aspect, the heat source is a source of waste heat.

In one embodiment of the second aspect, the first energy converter comprises a Leidenfrost device arranged to induce self-propel movement of the work material relative to the surface.

In one embodiment of the second aspect, the second energy converter is arranged to generate electrical energy based on (i) kinetic energy associated with the induced movement of the work material relative to the surface; and/or (ii) a changing magnetic field produced by the induced movement of the work material relative to the surface.

Other features and aspects of the invention will become apparent by consideration of the detailed description and accompanying drawings. Any feature(s) described herein in relation to one aspect or embodiment may be combined with any other feature(s) described herein in relation to any other aspect or embodiment as appropriate and applicable.

BRIEF DESCRIPTION OF THE DRAWINGS

Embodiments of the invention will now be described, by way of example, with reference to the accompanying drawings in which.

DETAILED DESCRIPTION

Figure 1:
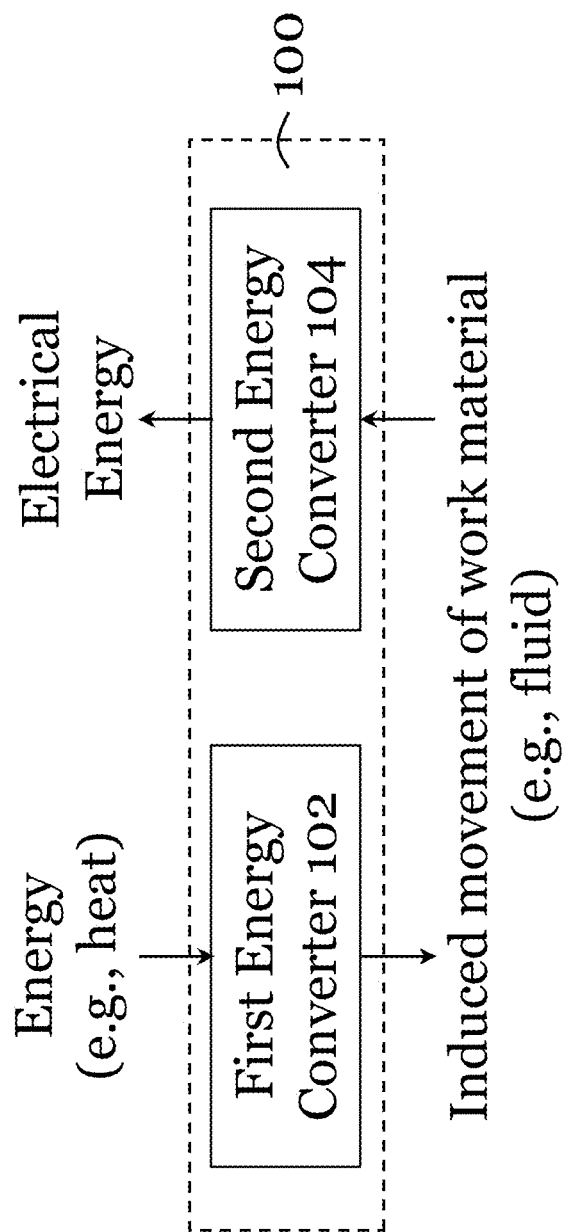
FIG. 1 is a schematic diagram of an energy generation device in one embodiment of the invention.

FIG. 1 shows an energy generation device 100 in one embodiment of the invention. The energy generation device 100 includes, in general, a first energy converter 102 and a second energy converter 104. The first energy converter 102 is arranged to convert energy, such as thermal energy, into induced movement of a work material, e.g., in a direction generally parallel to the surface. The second energy converter 104 is arranged generate electrical energy based on the induced movement of the work material. Essentially, the energy generation device converts the original energy into electrical energy. If the original energy is waste energy, such as low-grade energy or waste heat, the energy generation device may act as an energy recycling device.

The first energy converter 102 may include a surface that is arranged to support movement of a work material and to induce movement of the work material relative to the surface. For example, the surface may be arranged to induce self-propel movement of the work material relative to the surface, e.g., based on Leidenfrost effect, inverse Leidenfrost effect, etc. In one example, the first energy converter is a Leidenfrost device. In one example, the surface is arranged to be heated by a heat source to a temperature above an activation temperature so as to induce self-propel movement of the work material relative to the surface. The activation temperature may depend on various factors, including material of the surface, geometry of the surface, etc. The surface can be treated or untreated, and can be flat or uneven (e.g., roughened, textured). In one example, the surface is a ratcheted surface with ratchet teeth and groove(s) arranged between the ratchet teeth. The teeth may have asymmetric cross-section (e.g., generally triangular or generally trapezoidal). The teeth may have a varying cross-section across its length (or a long axis of the teeth). The surface may be part of the channel defined in a body that is thermally conductive. For example, the surface may extend the entire length of the channel. The channel can take different shape and form. In one embodiment, the channel is endless and/or annular. The work material may be in the form of a solid or fluid, and may change its phase based on the environment in which the first energy converter 102 is arranged or is subjected to. The work material may include a work fluid, e.g., a work liquid (liquid droplet(s), slug(s), or bulk-flow). The work material may include a magnetic material, e.g., a solution containing magnetic particles.

The second energy converter 104 may be arranged to generate electrical energy based on one or more of: kinetic energy associated with the induced movement of the work material relative to the surface, and a changing magnetic field produced by the induced movement of the work material relative to the surface. The second energy converter 104 may include a coil arrangement arranged to generate electrical energy (e.g., induced current, induced electromotive force/voltage) based on a changing magnetic field produced by the induced movement of the work material (e.g., the work material includes magnetic material) and relative to the surface. Additionally or alternatively, the second energy converter 104 may include a transducer (e.g., piezoelectric) arranged to convert kinetic energy associated with the induced movement of the work material relative to the surface into electrical energy.

The energy generation device 100 may include other features not illustrated. For example, the device too may include an electrical energy storage (e.g., circuit, capacitor, etc.) operably connected with the second energy converter 104 to store the electrical energy generated by the second energy converter 104. Additionally or alternatively, the energy generation device 100 may include an interface electrically connected with the second energy converter and arranged to be connected with a load (e.g., electrical device such as phone, IoT device, watch, computer, tablet, white goods, etc.) to provide the electrical energy generated by the energy converter to the load.

The inventor of the invention has devised, through research, experiments, and trials, that some material surfaces that support a liquid can enable "spontaneous" liquid motion and motion control by creating asymmetries of adhesion and/or wetting properties at the liquid-solid interface, leading to an unbalanced state that creates an exploitable driving force. The inventor of the invention has realized that various surface structures can be used to induce movement of liquid droplets, and such effect is observed when asymmetrically ratcheted surfaces (support liquid droplets) are heated. Under Leidenfrost conditions (i.e. film boiling), the liquid droplets are observed to self-propel relative to the surface with a velocity of about 0.1 m/s. The same effect has been achieved at lower surface temperatures by treating the surface with superhydrophobic coatings.

Figure 2A:
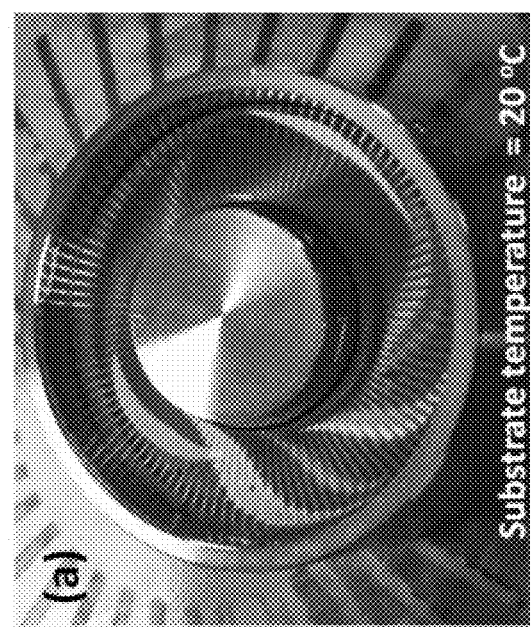
FIG. 2A is a picture showing a Leidenfrost ring at 20 degree Celsius and holding a work liquid.
Figure 2B:
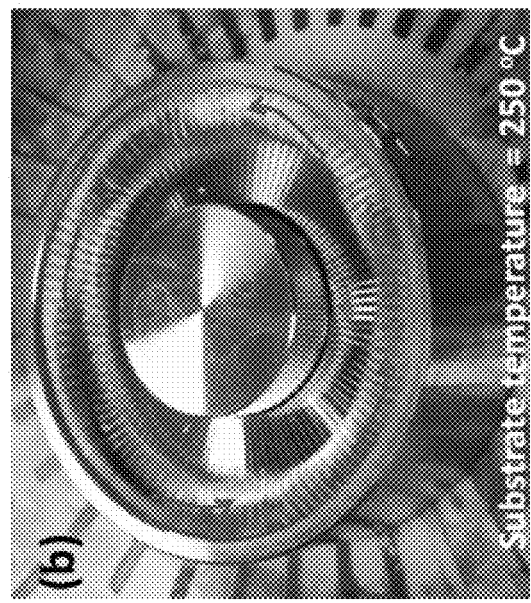
FIG. 2B is a picture showing a Leidenfrost ring at 250 degree Celsius and holding a work liquid.

FIGS. 2A and 2B show a Leidenfrost ring with a ratcheted surface on which a bulk of work liquid is arranged. In FIG. 2A, the surface is at 20 degree Celsius and no flow is observed. In FIG. 2B, the surface is at 250 degree Celsius and a liquid film moves relative to the surface in a directly generally parallel to the surface with a terminal velocity of about 0.3 m/s.

Figure 3:
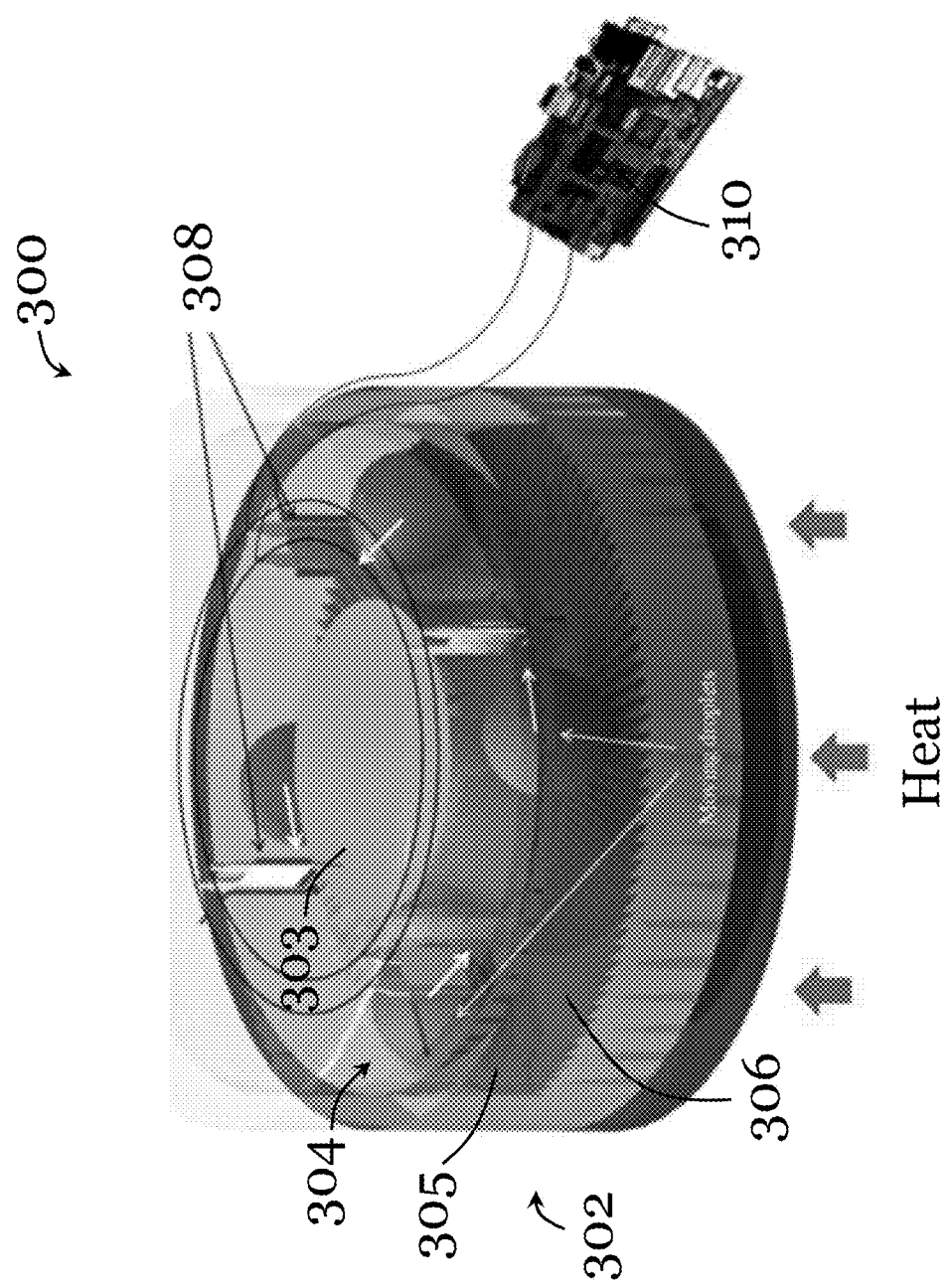
FIG. 3 is a schematic diagram of an energy generation device in one embodiment of the invention.

FIG. 3 shows an energy generation device 300 (also referred to as a "heat engine") in one embodiment of the invention. The device 300 includes a body 302 defining an annular channel 304. The channel 304 includes a base wall formed by a ratcheted surface 306 and two opposing side walls defined by an outer surface of a cylindrical post 303 of the body 302 and an inner surface of an annular wall portion 305 of the body 302. Liquid (illustrated as droplets but can be slugs or bulk-flow instead) are arranged in the channel 304 to flow in the channel 304. The body 302 is thermally conductive and the surface 306 is arranged to be heated by waste heat external of the device 300. The surface 306, when heated sufficiently, induces self-propel movement of the liquid in the channel 304 by virtue of Leidenfrost effect. The channel 304, being annular instead of linear, enables larger liquid slugs to self-propel at higher velocities to accumulate or have higher kinetic energy. The body 302 supports four cantilevered piezoelectric transducers 308, spaced angularly and substantially evenly, above the surface 306. The cantilevered piezoelectric transducers 308 are arranged to generate electrical signal or energy as the liquid droplets or liquid stream rotate in the channel (i.e., to capture the kinetic energy of the moving liquid). The faster the movement of the liquid droplets, the more the electrical signal or energy generated by the transducers 308. An energy storage means (e.g., circuit) 310 is connected with the transducers 308 to store the generated electrical energy. The device 300 relies on a "flow-to-energy" phenomena for converting waste heat into electricity (or electrical energy) and enables a relatively high energy conversion efficiency.

An analytical model of the ratcheted surface is now presented with reference to FIGS. 4A to 4D.

| Symbol | Meaning |
|---|---|
| A | Contact area of a droplet as viewed from above (m$^2$) |
| $A_i$ | Apparent contact area in each single ratchet as viewed from above (m$^2$) |
| $A_{i,1}$ | Effective contact area of the deformed liquid lying on the slope of the ratchet (m$^2$) |
| a | Acceleration of the droplet (m/s$^2$) |
| $C_1$ | Proportion of the deformed part AC |
| $C_2$ | Proportion of the deformed part BC |
| C(T) | Temperature-dependent properties of the vapour flow (kg) |
| $c_1$ | Constants of integration |
| $c_2$ | Constants of integration |
| $D_o$ | Outer diameter of the ring (m) |
| $D_i$ | Inner diameter of the ring (m) |
| F | Net force of the droplet (N) |
| $F_f$ | Driving force (N) |
| $F_{f,i}$ | Driving force in a single ratchet (N) |
| $F_{i,1}$ | Supporting force acting on the deformed droplet, exerted from arc AC (N) |
| $F_{i,2}$ | Supporting force acting on the deformed droplet, exerted from arc BC (N) |
| G | Gas phase |
| g, | Gravitational acceleration (m/s$^2$) |
| $g_x$, | Gravitational acceleration in x direction (m/s$^2$) |
| $g_y$, | Gravitational acceleration in y direction (m/s$^2$) |
| $H_L$ | Droplet height (m) |
| $h_o$ | Vapour layer thickness (m) |
| L | Liquid phase |
| $L_L$ | Latent heat of evaporation of the droplet (J/kg) |
| $l_1$ | Length of deformed side AC (m) |
| $l_2$ | Length of deformed side BC (m) |
| M | Droplet mass (kg) |
| $m_i$ | Droplet mass within a single ratchet (kg) |
| ΔP | Pressure difference that directs the vapour flow (Pa) |
| R | Droplet radius (m) |
| S | Solid phase |
| ΔT | Temperature difference between the droplet and the solid surface (° C.) |
| $u_o$ | Velocity of the vapour flow at y = 0 (m/s) |
| $u_h$ | Velocity of the vapour flow at y = $h_o$ (m/s) |
| $u_{max}$ | The maximum velocity of the vapour flow (m/s) |
| $u_x$ | Velocity of the vapour flow in x direction (m/s) |
| $\overline{u_x}$ | Average velocity of the vapour flow in x direction (m/s) |
| V | Liquid volume (m$^3$) |
| υ | Droplet's velocity (m/s) |
| W | Width of the ring (m) |
| $w_{i,1}$ | Width of the droplet (m) |
| Δx | Distance of the vapour flow (m) |
| α | Inclined angle of the teeth relative to the horizontal (rad) |
| β | Deformed angle of the arc AC relative to the horizontal (rad) |
| θ | Deformed angle of the arc BC relative to the horizontal (rad) |
| ε | Ratchet height (m) |
| λ | Ratchet period (length) (m) |
| $\lambda_e$ | Effective ratchet period (length) (m) |
| $\lambda_{e,i}$ | Effective ratchet period at the inner edge of the ring (length) (m) |
| $\lambda_{e,o}$ | Effective ratchet period at the outer edge of the ring (length) (m) |
| $\lambda_i$ | Ratchet period at the inner edge of the ring (length) (m) |
| $\lambda_o$ | Ratchet period at the outer edge of the ring (length) (m) |
| μ | Viscosity of the vapour flow at mean temperature of the boiling point of the droplet and the surface temperature (Pa · s) |
| $\rho_L$ | Density of the liquid at its boiling point (kg/m$^3$) |
| $\rho_v$ | Density of the vapour flow at mean temperature of the boiling point of the droplet and the surface temperature (kg/m$^3$) |
| ϵ | Amplitude of the deformed droplet (m) |

Figure 4B:
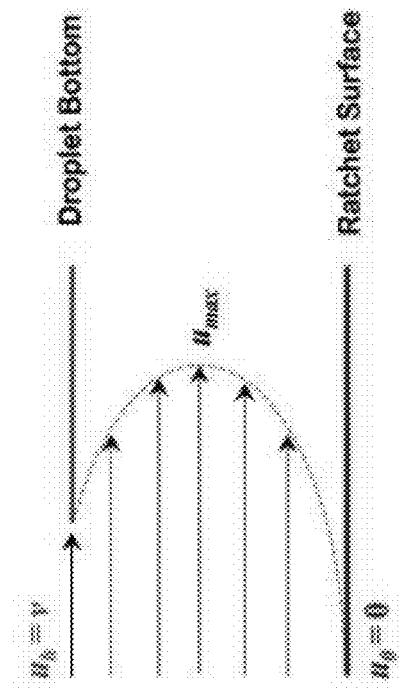
FIG. 4B is a schematic diagram of a vapour velocity profile between the ratchet and the liquid droplet in FIG. 4A.
Figure 4A:
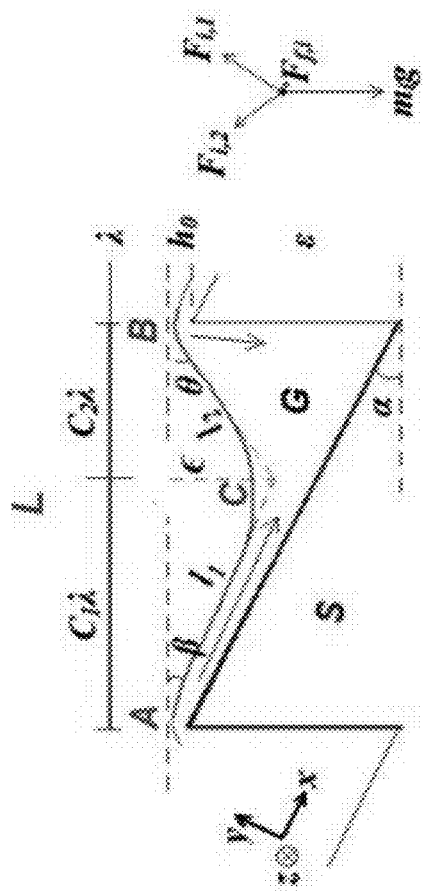
FIG. 4A is a schematic diagram of a ratchet teeth supporting a moving liquid droplet.

FIG. 4A shows a ratchet teeth (or simply, ratchet) supporting a moving liquid droplet. The ratchet teeth defines a single groove with a width λ and height ε. The droplet sits a distance of $h_o$ above the ratchet. The droplet has two deformed angles of β and θ. The ratchet has a period of λ and depth of ε. S, G & L represent solid, gas and liquid phases. A Cartesian coordinate system is defined, with x parallel to the slope of the ratchet and y perpendicular to the slope. In FIG. 4A, C represents the lowest point of liquid within each ratchet, which divides the deformation into two parts. Arc AC follows the slope of the ratchet, and is responsible for producing the directed vapor flow that drags the droplet. Arc BC hangs over the vertical step of the ratchet. The evaporated vapor here mainly flows downwards then into and out of the plane of the diagram. $C_1$ and $C_2$ are used to describe the resulting proportions of AC and BC, since C can fall anywhere between A and B.

FIG. 4B illustrates a vapour velocity profile between the ratchet and the liquid droplet in FIG. 4A.

In this model, the pressure-driven vapor flow along the line AC behaves as a Poiseuille flow. It is assumed to be incompressible with constant density $\rho_v$ and viscosity $\mu$, and the velocity distribution of the vapour flow is described by Navier-Stokes equations at steady state (considering only the x direction). The shear stress between the vapour and droplet induces droplet motion. This stress is obtained from the velocity distribution at the lower edge of the droplet. An expression for this velocity distribution $u_x$ can be derived by solving the continuity and Navier-Stokes equations using the no-slip boundary condition. The shear stress can be represented as:

$$F_{f,i} = -\mu \frac{du_x}{dy} A_{i,1} |_{y=h_o} = -\frac{1}{2} A_{i,1} \left( \frac{\partial P}{\partial x} - \rho_v g_x \right) h_o - \frac{\mu v}{h_o} A_{i,1} \quad (1)$$

Here, $A_{i,1}$ is the effective contact area of the deformed liquid lying on the slope of the ratchet, $\partial P/\partial x$ is the pressure gradient that induces such vapour flow along the slope AC, $g_x = g \sin \alpha$ comes from the partial effect caused by gravity, and $v$ is the droplet's velocity. $A_{i,1}$ itself can be expressed as $w_{i,1} C_1 \lambda / \cos \beta$ where $w_{i,1}$ is the width of the droplet into and out of the plane shown in FIG. 4A.

The overpressure $\Delta P$ is generated by the weight force distribution. The pressure around point C is assumed to be close to atmospheric pressure because of the large amount of air in the spacious ratchet corners. FIG. 4A also shows the directions of the different forces acting on the droplet. $F_{i,1}$ and $F_{i,2}$ are the forces exerted perpendicular to the lines AC and BC respectively, as the vapour is expelled from the droplet. The weight force acting downward due to gravity is simply $m_i g$. The driving force (i.e. shear stress $F_{f,i}$) becomes negligible when compared with the much larger weight force distribution. For example, a droplet of 30 µL weighs ~300 µN while its net driving force is only ~17 µN. This means the deformation is mainly caused by gravity since the shear force caused by the viscosity has little effect. By applying a force balance analysis, an expression for the pressure gradient can be derived as:

$$\frac{dP}{dx} \approx -\frac{m_i g \sin \theta}{\sin(\theta + \beta) \left( \frac{w_{i,1} C_1 \lambda}{\cos \beta} \right) \left( \frac{C_1 \lambda}{\cos \beta} \right)} \quad (2)$$

The total horizontal driving force is the sum of the individual driving forces generated within each ratchet period $F_f = \Sigma F_{f,i} \cos \beta$. By further considering the deformation geometry given in FIG. 4A, the following first principles model for the driving force can be obtained:

$$F_f = \frac{gh_o}{2} \left( \frac{M}{\lambda} + \rho_v A \frac{\sin \alpha \sin \theta}{\sin(\theta + \beta)} \right) \cos \beta - \frac{\mu A}{h_o} \frac{\sin \theta \cos \beta}{\sin(\theta + \beta)} v \quad (3)$$

Here, M is the total mass of the droplet, A is the total area of the droplet as viewed from above. The contact area of the droplet A can either be measured experimentally or approximated for large droplets by assuming that the ratio of the volume to height $V/H_L$ will remain constant. This expression shows that the driving force is dependent upon the liquid/vapour properties (A, M, $\theta$, $\beta$, $\rho v$, $h_o$ and $\mu$), ratchet geometric parameters ($\lambda$ and $\alpha$), gravity (g) and the droplet's velocity v.

When the surface temperature is at about 400° C., the temperature of the liquid droplet is at about 100° C. (boiling point), with a corresponding density of $p_L \sim 10^3$ kg/m$^3$. Assuming that the vapour temperature is an average of the two (250° C.), the vapour density and viscosity will be $\rho_v \sim 0.42$ kg/m$^3$ and $\mu \sim 1.82 \times 10^{-5}$ Pa.s respectively, giving a corresponding film thickness of $h_o \sim 10\text{-}100$ µm. Consequently, the mass term in Equation 3 is several orders of magnitude larger than the other terms. This means the droplet's velocity has little influence on the driving force, simplifying the Equation to give the same scaled expression as the model analysis for a rigid solid, but this time derived from first principles.

An expression for the vapour film thickness $h_0$ can then be obtained using a simple mass balance by equating the mass lost from the droplet to the vapour mass flow rate. Applying the same physical approximations based on the geometry as applied above, the final force expression can be derived as:

$$F_f = \frac{Mg}{2} \lambda^{-1/2} C(T)^{1/4} \left( \frac{A}{M} \right)^{1/4} \left( \frac{\sin \theta \cos^2 \beta}{\sin(\theta + \beta)} \right)^{1/2} \quad (4)$$

Here, the C(T) term (=12 $\mu \Delta T/\rho_v g L_L$) describes the temperature-dependent properties of the vapour flow: $\kappa$ is the thermal conductivity of the vapour, $L_L$ is the latent heat of evaporation, and $\Delta T$ is the temperature difference between the base of the droplet and the ratchet surface. For large droplets with a constant droplet height, the mass can be further approximated by $M = \rho_L H_L A$. The corresponding expression for droplet acceleration is obtained from F=M$\alpha$:

$$a = \frac{g}{2} \lambda^{-1/2} C(T)^{1/4} \left( \frac{A}{M} \right)^{1/4} \left( \frac{\sin \theta \cos^2 \beta}{\sin(\theta + \beta)} \right)^{1/2} \quad (5)$$

Equations 4 and 5 suggest that the driving force and acceleration are dependent on droplet radius/height, the ratchet geometry, the surface temperature, and the liquid deformation angle into the grooves of the ratchets. Though both the driving force and acceleration are relatively insensitive to the droplet height and temperature, because $C(T)^{1/4}$ and $(A/M)^{1/4}$ will remain relatively constant over a large temperature range (100's ° C.). For a flattened droplet, the deformation angles $\theta$ & $\beta$ in every ratchet are also comparable. Therefore, on a ratcheted surface with a constant period $\lambda$, the driving force should be a function of the droplet radius R alone, with an exponent of ~2 by replacing the first term in Equation 4 with $M = \rho_L \pi R^2 H_L$. Following this, the acceleration model will be similar for droplets with different volumes.

Note, if $\beta \sim \alpha$, a slightly alternative expression for the driving force can be obtained:

$$F_f = \frac{Mg}{2} C(T)^{1/4} \left(\frac{A}{M}\right)^{1/4} \left(\frac{1}{1+C_2/C_1} \cdot \frac{1}{\sqrt{\lambda^2+\varepsilon^2}}\right)^{1/2} \quad (6)$$

This form emphasizes the role of the geometry of the ratchet. The smaller the value of $\sqrt{\lambda^2+\varepsilon^2}$, the larger the driving force produced. The above model (Equation 4) predicts that the driving force is proportional to the droplet radius to the power of 2.

Figure 4C:
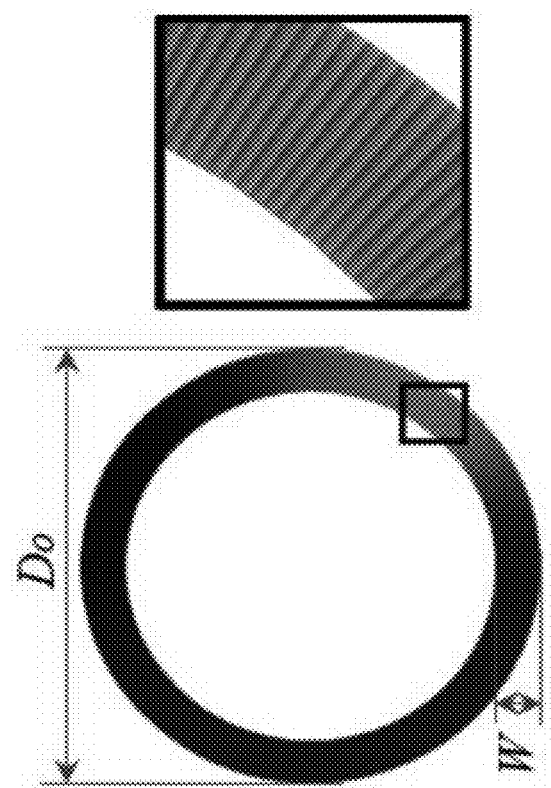
FIG. 4C is a plan view of a schematic of a Leidenfrost ring surface.
Figure 4D:
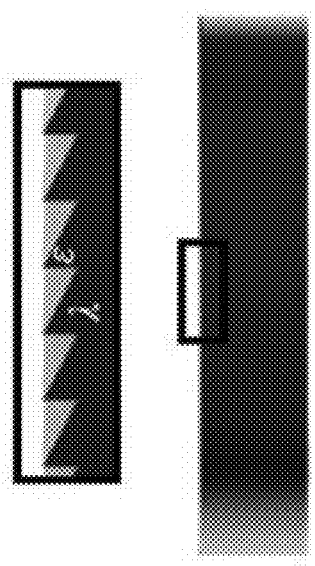
FIG. 4D is a side view of the Leidenfrost ring surface of FIG. 4C.

Experiments were performed using de-ionized water droplets on aluminium ratcheted rings such as the device shown in FIGS. 4C and 4D. FIG. 4C shows, from top-down, the experimental rings (W and $D_o$ represent width and outer diameter respectively) whereas FIG. 4D shows the ratchet from the side (the ratchet period changes from the inner edge ($\lambda_i$) to the outer edge ($\lambda_o$) whilst the ratchet height ($\varepsilon$) is fixed).

The use of ring structure instead of linear structure enables the terminal velocity of the liquid to be reached in a much smaller footprint. Four different ring designs were used in the experiments. The geometric parameters of these rings are summarized in Table 1. The ratchets were either triangular or trapezoidal (having a 'flat top').

TABLE 1

Experimental ring geometries

| Ring Design | Outer Diameter (mm) | Inner Diameter (mm) | Ratchet Shape | | $\lambda$ (mm) | $\lambda_e$ (mm) | $\varepsilon$ (mm) | Flat Top Length (mm) |
|---|---|---|---|---|---|---|---|---|
| 1 | 103 | 83 | o. | △ | 1.05 | 1.05 | 0.5 | — |
|   |     |    | i. | △ | 0.85 | 0.85 |     | — |
| 2 |     |    | o. | △ | 1.14 | 0.87 |     | 0.27 |
|   |     |    | i. | △ | 0.91 | 0.86 |     | 0.05 |
| 3 |     |    | o. | ▱ | 3    | 3    |     | — |
|   |     |    | i. | ▱ | 2.41 | 2.41 |     | — |
| 4 | 38  | 18 | o. | △ | 1.07 | 0.79 | 0.4 | 0.28 |
|   |     |    | i. | △ | 0.5  | 0.5  |     | — | o. and i. represent the outer and inner side of the ring respectively
$\lambda_e$ is the effective ratchet period of trapezium-shaped steps ($\lambda_e = \lambda - $|Flat Top Length|)

The rings were heated to 450° C., 400° C., 350° C. and 300° C. using a hot plate, and large droplets were deposited onto the surface via a micro-pipette with an initial negative velocity (moving from right to left in FIG. 4A). These droplets would then rapidly decelerate, before coming to a stop, then accelerating to positive velocities (moving from left to right in FIG. 4A. This method can remove experimenter bias from the acceleration measurements. The droplet motion was investigated using a high-speed camera that recorded image sequences with a 20MS timestep size. Droplet velocities (v), top-down contact areas (A) and acceleration ($\alpha$) were subsequently available via image analysis. ImageJ (Fiji) and a custom MATLAB program were used to automatically detect the moving droplets by tracking the center of mass. The initial slope of the velocity-time graphs were taken as the acceleration, since the initial droplet friction due to kinetic energy loss was negligible.

In this example, the droplets evaporate over time. Therefore, a simple calibration of the volume against the measurable top-down contact area was performed to confirm that the measured acceleration of the droplets were accurate (since if the droplet took a long time to decelerate upon injection into the ring, the volume might have decreased enough to influence its acceleration, causing a deviation from the model).

Figure 5A:
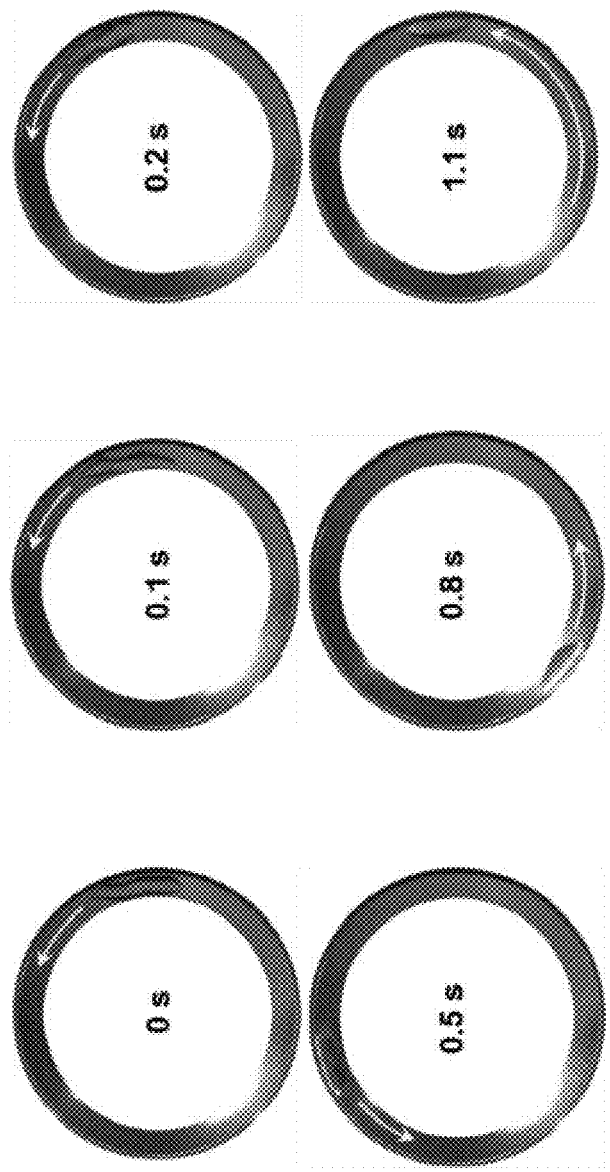
FIG. 5A is a series of diagrams showing movement of liquid on the Leidenfrost ring surface.

FIG. 5A is a series of diagrams showing movement of Leidenfrost droplet (600 µL) on the Leidenfrost ring of design 1 in Table 1. As seen from FIG. 5A, in the initial acceleration period, the droplet was spread with irregular shape because of the considerable driving force of this ratchet design. But quickly the shape became regular as an ellipse. In FIG. 5A, the droplet shape in the top-down view was typically elliptical rather than circular (0.5-1.1s after deposit). Here the liquid spread in the direction of self-propulsion in accordance with the shear force direction. Specifically, on ring design 1 the high driving force caused the droplets to become elongated and flattened during the initial acceleration period developing an irregular shape as shown in FIG. 5A (0 to 0.2s). Here, the contact area is considerably enlarged, further increasing the driving force and acceleration according to Equations 4 and 5. The droplet shape then becomes regular after a short period as the driving force weakens as the droplet velocity increases (as shown in FIG. 5A).

Under film boiling conditions on a flat surface, a vapour pocket will become trapped beneath the droplet, whereas the ratcheted texture of the rings enables this vapour to escape laterally within the grooves, improving the stability of the droplets. The deformation of a droplet on two different ratcheted substrates is shown in the microscopic images of FIGS. 5B and 5C.

Figure 5B:
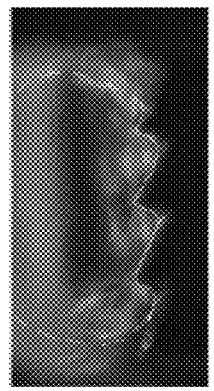
FIG. 5B is a series of microscopic images showing deformation of liquid on a Leidenfrost ring surface.
Figure 5B:
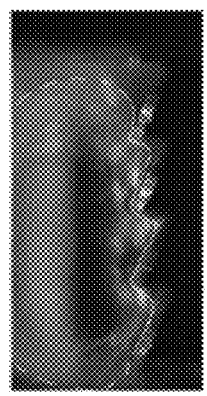
Figure 5B:
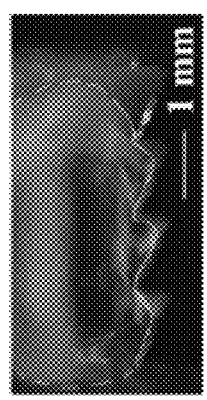
Figure 5C:
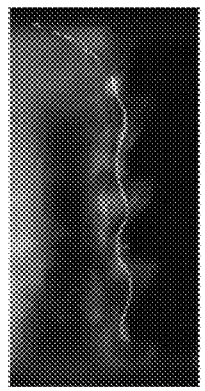
FIG. 5C is a series of microscopic images showing deformation of liquid on another Leidenfrost ring surface.
Figure 5C:
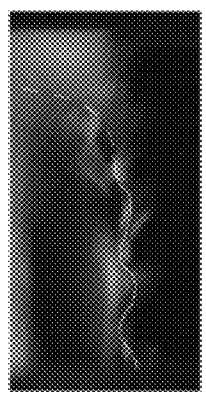
Figure 5C:
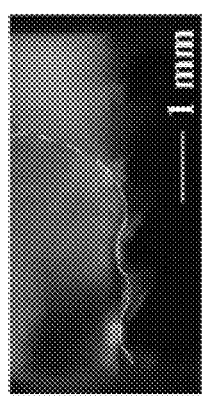

Here, the images in FIG. 5B correspond to a ring with triangular shaped teeth (where $\lambda_o=2\varepsilon$), and the images in FIG. 5C correspond to a ring with trapezium shaped teeth (with $\lambda_{e,o} \sim \varepsilon$). On the triangular teeth, the ratchet period ($\lambda_o$) is larger than the ratchet height ($\varepsilon$), and it was found that $C_1 \sim 2C_2$ (FIG. 5B). On the trapezium shaped ratchets, it was found that $C_1 \sim C_2$ where the effective ratchet period is comparable with its height $\lambda_{e,o} \sim \varepsilon$ (FIG. 5C). This illustrates that the deformation angles are largely dependent on the geometry of the ratchets, reducing the amount of experimental observation required to apply Equations 4 and 5.

Figure 6A:
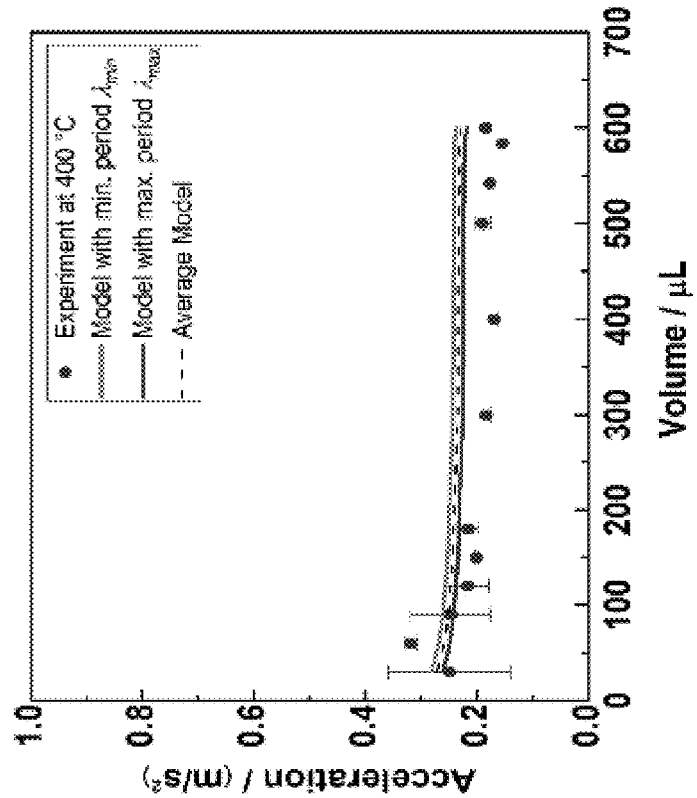
FIG. 6A is a graph showing the effect of volume of liquid droplet on acceleration of the liquid droplet on a Leidenfrost ring surface (Design 1)
Figure 6B:
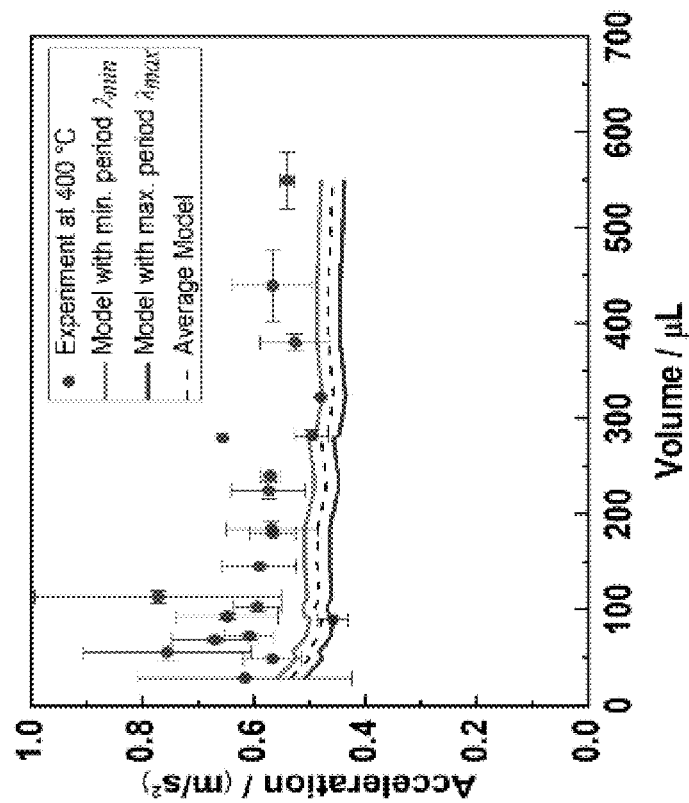
FIG. 6B is a graph showing the effect of volume of liquid droplet on acceleration of the liquid droplet on a Leidenfrost ring surface (Design 2)
Figure 6D:
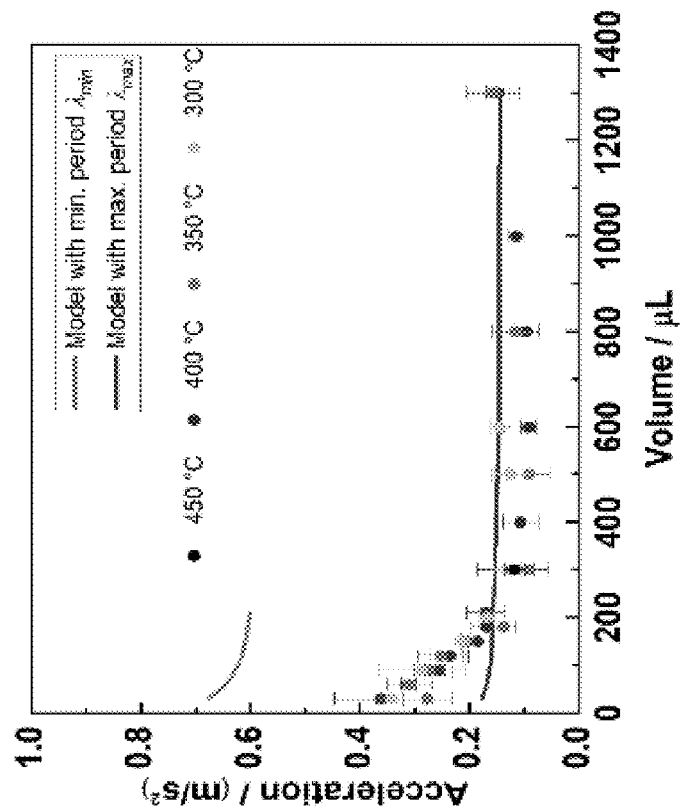
FIG. 6D is a graph showing the effect of volume of liquid droplet on acceleration of the liquid droplet on a Leidenfrost ring surface (Design 4)
Figure 6C:
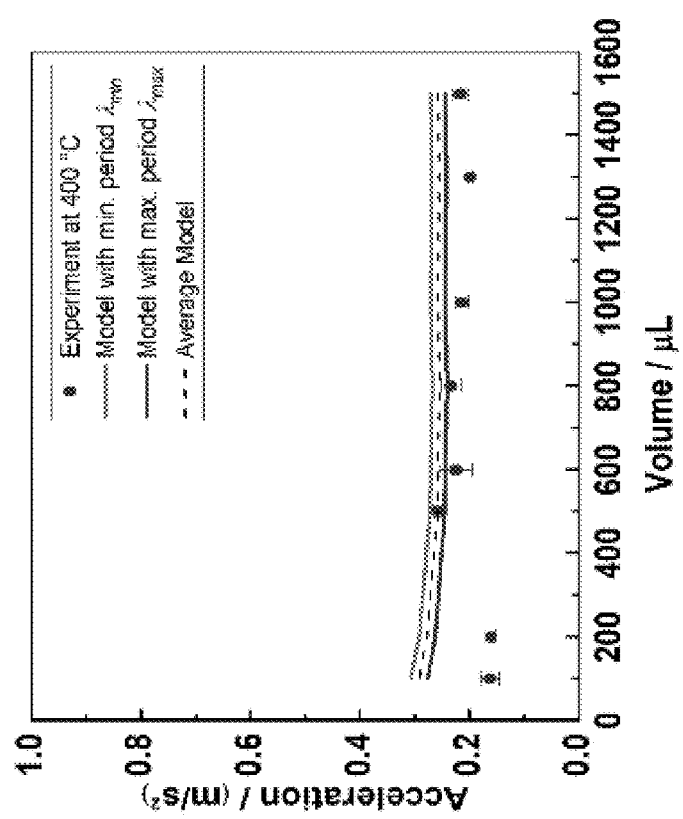
FIG. 6C is a graph showing the effect of volume of liquid droplet on acceleration of the liquid droplet on a Leidenfrost ring surface (Design 3)

FIG. 6A to 6D presents the effect of droplet volume on initial acceleration of the liquid for all four ring designs listed in Table 1. Each group of data was repeated at least three times. The upper line is the model prediction when the ratchet period is taken as the inner edge parameter ($\lambda=\lambda_{e,i}$) whilst the lower model line is the prediction using the outer edge geometry ($\lambda=\lambda_{e,o}$). FIG. 6A shows the result of ring design 1 (400° C.); FIG. 6B shows the results of ring design 2 (400° C.); FIG. 6C shows the result of ring design 3 (400° C.); FIG. 6D shows the results of ring design 4 (450° C., 400° C., 350° C. and 300° C.).

These Figures show a close agreement between the model and experimental data, with deviations of 16.6-22.7%, 15-24%, 9-21% and 26.6% (for large drops, ≥159 μL) respectively. When small droplets were deposited on the ring, they tended to settle at the inner edge as they transitioned from the initial negative velocity to a positive velocity. Then, as these started to accelerate in the "positive" direction, centrifugal force caused them to move to the outer edge. Thus, it is possible that the acceleration induced by the changing ratchet parameters also continuously changed. In contrast, larger droplets tended to fill the full annular width of the ring, so the average ratchet properties did not change.

The largest deviation between experimental data and model occurred for ring design 1, and it is believed that the elongation effect observed in FIG. 5A might explain this behaviour—the droplets became temporarily stretched out causing them to flatten and increase their contact area, thus increasing the driving force. The surface tension takes a dominant role in maintaining a stable droplet height since the shear force only acts beneath the droplet. For example, for a droplet with R~3 mm, the shear force and surface tension are ~25 μN and ~354 μN respectively. Surface tension and gravity are mainly responsible for restoring the "normal" droplet shape, especially small droplets that do not have a constant height.

When the ratchets are designed with comparable period and height (such that $\lambda_{e,o} \sim \epsilon$), the driving force and acceleration will become weaker because the droplet deformation becomes more symmetric (i.e., where $C_1 \approx C_2$), which reduces the AC vapour flow distance, and therefore the shear force acting on the droplet. Additionally, trapezoidal ratchet design (FIGS. 5B and 5C) will further reduce the effective driving force acting on the whole droplet. This can be seen by comparing FIG. 6A (triangular ratchets) with FIG. 6B (trapezoidal ratchets). As discussed, small droplets change their trajectory as they accelerate. Since ring design 4 transitioned from triangular to trapezoidal ratchets between the inner and outer edges respectively, the model predicted a large deviation between acceleration at each edge (FIG. 6D). The experimental results accordingly reside between these two ultimate limits. In addition, the result shows insignificant differences in terms of temperature, which in turn agrees with the statement (C(T)) made in the model analysis.

For small droplets on ring design 3, only a small number of ratchets were covered because of the larger ratchet period. The energy loss/friction caused when the small droplets attempted to overcome the potential energy to self-propel then became dominant, explaining the deviation at volumes≤200 μm as observed in FIG. 6C.

It has been found that the terminal velocity tended to increase with increasing droplet volume, reaching a plateau around 0.39 m/s, which is much higher than velocities observed on millimeter scaled ratchets (~0.1 m/s). It is believed that the ratchet parameters play an important role for this increased velocity, because the driving force is inversely proportional to the ratchet slope ($\sqrt{\lambda^2+\epsilon^2}$) according to Equation 6. On a smaller scaled ratchet, the velocity is reduced to ~0.27 m/s, which supports this belief to some extent and may provide useful information for optimizing the designs to maximize thermal to kinetic energy conversion.

The agreement between the experimental data and the proposed model in the above embodiment further support the dominant role of the "viscous stress mechanism" in explaining the motion of these droplets on ratcheted surfaces. The model shows that acceleration is independent of the volume for a broad range of conditions, suggesting that the driving force is exactly scalable with the droplet mass. The relatively small driving force (a consequence of the shear stress between the vapour and droplet) in comparison to the surface tension causes the droplets to maintain a reasonably stable height and contact area under different surface temperatures and ratchet geometries. Although the ratchets induce liquid deformation, they also create a space for the vapour to escape from beneath the droplet, making the droplet stay in a non-wetting state comparable to that of a superhydrophobic surface. The liquid deformation is unchanged for droplets with different volumes, and is largely dependent on the ratchet's length to height ratio, further reducing the complexity of the model.

Figure 7:
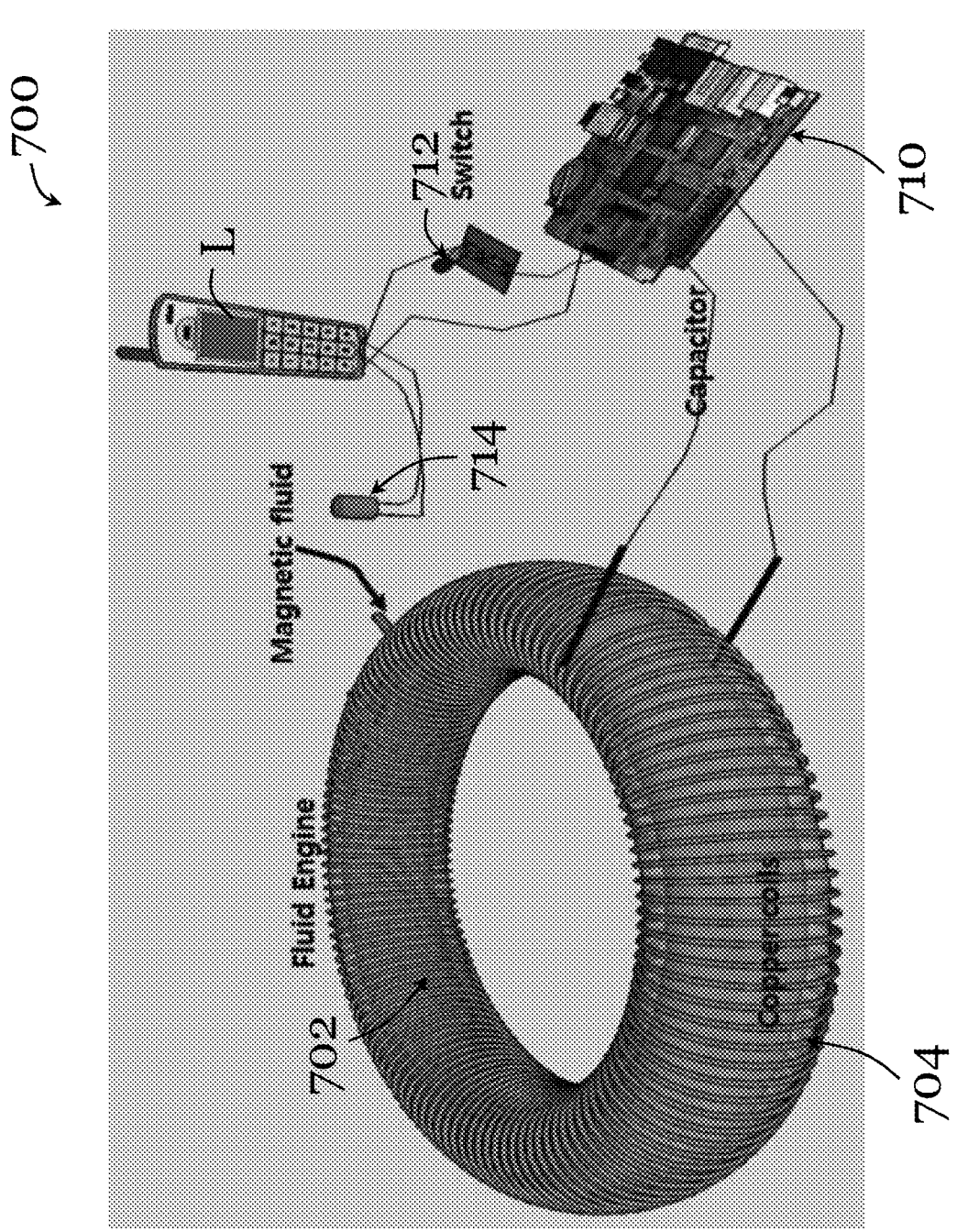
FIG. 7 is a schematic diagram of an energy generation device in another embodiment of the invention.

FIG. 7 is an energy generation device 700 in another embodiment of the invention. The device 700 includes a first energy converter in the form of a fluid engine 702 and a second energy converter in the form of a coil arrangement 704. The fluid engine 702 includes a generally toroidal body. The body is made of a material that is non-electrically-conductive and/or non-magnetic. The body defines a channel with a surface arranged to support movement of a work fluid and to induce movement of the work fluid relative to the surface. The surface and/or the induced movement may be similar as those presented above with reference to FIGS. 2A to 6D. The body is thermally conductive such as waste heat can be conducted from outside the body to the surface. The coil arrangement 704 includes a set of copper coils spirally around the generally toroidal body. The device 700 also includes an energy storage circuit 710 having capacitor (s) or like energy storage means, an on/off switch 712, a load (illustrated as a phone) L, and an indicator (e.g., LED) 714. The work fluid used in this embodiment is a magnetic fluid, e.g., a fluid that that has magnetic particles coated with surfactants that allow the particles to be fully dispersed. In operation, the surface is heated to induce movement of the magnetic work fluid in the channel. The fluid engine 702 acts to "pump" the magnetic fluid in the channel or along the surface. Induced movement of the magnetic fluid leads to time variation in the magnetic moments and produces electrical energy/power that is picked up by the coil arrangement 704. The electrical energy generated in the coil arrangement 704 can be stored in the energy storage circuit 710 and can be supplied to a load as needed. The device may include a connection interface for connection of the load L. The on/off switch 712 allows the user to control whether to provide power from the energy storage circuit 710 to the load L to charge or power the load L. The LED 714 indicates whether the device 700 is operating (charging or powering the load).

Figure 8:
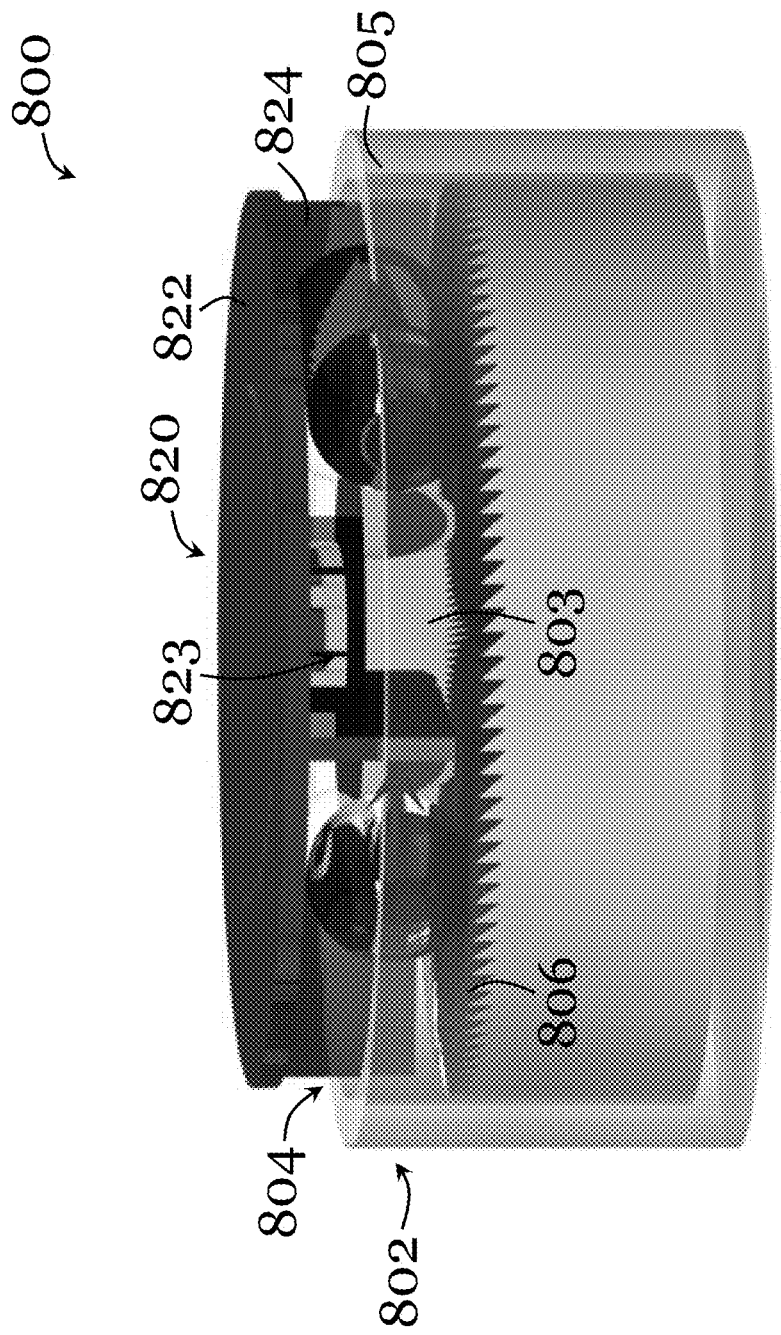
FIG. 8 is a schematic diagram of an energy generation device in yet another embodiment of the invention.

FIG. 8 is an energy generation device 800 in yet another embodiment of the invention. The device 800 includes a body 802 defining a channel 804. The channel 804 includes a base wall formed by a ratcheted surface 806 and two opposing side walls defined by an outer surface of a cylindrical post 803 of the body 802 and an inner surface of an annular wall portion 805 of the body 802. Liquid (illustrated as droplets but can be slugs or bulk-flow instead) are arranged in the channel 804 to flow in the channel 804. In this example the liquid is water. The body 802 is thermally conductive and the surface 806 is arranged to be heated by waste heat external of the device 800. The surface 806, when heated sufficiently, induces self-propel movement of the liquid in the channel 804 by virtue of Leidenfrost effect. A lid 820 is rotatably coupled to the body 802 via a bearing assembly (with one or more bearings). The lid 820 has a circular base 822, a central coupling portion 823 arranged on the circular base 822 for coupling to the body 802 via the bearing assembly, and four radially-extending plates 824 extending generally perpendicular from the circular base 822 between the circular base 822 and the surface 806 (without touching the surface 806). The plates 824 are angularly spaced apart by generally the same distance. The plates 824 have a length shorter than the radius of the base 822. The plates 824 divide the channel 804 into multiple portions (one portion between adjacent plates 824), each portion holding one or more liquid droplets. The lid 820 is operably connected to a mechanical-to-electrical energy converter (not shown), such as an electromagnetic system or a triboelectric nanogenerator, that is arranged generate electrical energy based on rotation of the lid 820. In use, when the surface 806 is heated sufficiently, the liquid droplets self-propels on the surface 806 (anti-clockwise in this embodiment as indicated by the arrow in FIG. 8). The liquid droplets hit and push the wall 824 to cause the lid 820 to rotate relative to the body 802. As the lid 820 rotates, the mechanical-to-electrical energy converter operably coupled with the lid 820 generates and optionally stores electricity (or electrical energy). Generally, the faster the movement of the liquid droplets, the faster the movement of the lid, the more the electrical energy generated. In this example, the lid rotational speed can reach 510 rpm (~0.15 m/s) and the voltage generated by the system can reach 1000V.

The above embodiments of the invention have provided an energy generator or energy converter operable to convert thermal energy into electrical energy. The energy generator or converter may be considered as a "heat" driven power generator. The energy generator or energy converter can be used in various applications, e.g., in indoors or in industrial indoor low-grade water heat recovery sector and various industries (e.g., automotive, building and contraction, domestic, power and gas, electronics, aviation, etc.).

Some embodiments of the energy generator or energy converter may include one or more of these advantages: 1) simple and reliable for sustained electricity generation using simple and robust equipment; 2) flexibility for application in a wide range of applications; 3) usable to recover low grade heat (e.g., temperature range: 50 degree Celsius to 500 degree Celsius); 4) easily scaled; 5) relatively inexpensive; and 6) minimal (e.g., zero) carbon emissions.

It will be appreciated by persons skilled in the art that numerous variations and/or modifications may be made to the invention as shown in the specific embodiments to provide other embodiments of the invention. The described embodiments of the invention should therefore be considered in all respects as illustrative, not restrictive.

For example, some embodiments of the invention can use higher grade heat (e.g., not waste heat) to induce movement of the work material relative to the surface. The work material can be solid or fluid, and can be induced to move by virtue of, e.g., Leidenfrost effect, inverse Leidenfrost effect, etc. One or both of the work material and the surface supporting the work material may be heated, so long as the temperature difference between the two are sufficient to induce movement of the work material relative to the surface. The specific design (form, shape, structure) of the surface can be modified based on applications. The body of the energy generation device may be constructed using one or more pieces of components. The scale of the device can be small (e.g., portable) or large. The performance parameters of the energy generation device or energy converter may be different from those illustrated, depending on the specific design of the energy generation device or energy converter.

The invention claimed is:

1. An energy generation device, comprising:
   a surface for supporting movement of a work material, the surface being operable to induce movement of the work material relative to the surface;
   an energy converter arranged to generate electrical energy based on the induced movement of the work material relative to the surface;
   a body defining a channel arranged to receive the work material, the channel comprising the surface and being an annular endless channel; and
   a lid rotatably coupled to the body, the lid including one or more plates, wherein the induced movement of the work material relative to the surface causes the work material to engage the one or more plates to rotate the lid relative to the body.

2. The energy generation device of claim 1, wherein the surface is operable to induce self-propel movement of the work material relative to the surface.

3. The energy generation device of claim 2, wherein the surface is arranged to be heated by a heat source to a temperature above an activation temperature to induce self-propel movement of the work material relative to the surface.

4. The energy generation device of claim 3, wherein the heat source comprises a source of waste heat.

5. The energy generation device of claim 1, wherein a direction of the induced movement of the work material is generally parallel to the surface.

6. The energy generation device of claim 1, wherein the surface comprises a ratcheted surface.

7. The energy generation device of claim 6, wherein the ratcheted surface comprises:
   a plurality of teeth extending across a width of the ratcheted surface; and
   corresponding groove arranged between adjacent teeth.

8. The energy generation device of claim 7, wherein the teeth has a cross-section that is asymmetric.

9. The energy generation device of claim 8, wherein the cross-section of the teeth is generally triangular or generally trapezoidal.

10. The energy generation device of claim 8, wherein the cross-section of the teeth changes across the width of the ratcheted surface.

11. The energy generation device of claim 1, wherein the surface is arranged along the entire channel.

12. The energy generation device of claim 1, further comprising the work material, and the work material comprises a work liquid.

13. The energy generation device of claim 1, further comprising the work material, and the work material comprises a magnetic material.

14. An energy generation device, comprising:
    a surface for supporting movement of a work material, the surface being operable to induce movement of the work material relative to the surface;
    an energy converter arranged to generate electrical energy based on the induced movement of the work material relative to the surface;
    wherein the energy converter comprises a coil arrangement arranged to generate electrical energy based on a changing magnetic field produced by the induced movement of the work material relative to the surface.

15. The energy generation device of claim 14, wherein the coil arrangement comprises a coil spiraling around the surface along a length of the surface.

16. The energy generation device of claim 1, wherein the energy converter comprises a transducer arranged to convert kinetic energy associated with the induced movement of the work material relative to the surface into electrical energy.

17. The energy generation device of claim 16, wherein the transducer comprises a piezoelectric transducer.

18. The energy generation device of claim 1, further comprising an electrical energy storage operably connected with the energy converter to store the electrical energy generated by the energy converter.

19. The energy generation device of claim 1, further comprising an interface electrically connected with the energy converter, the interface being arranged to be connected with a load to provide the electrical energy generated by the energy converter to the load.

20. An energy recycling device comprising:
a first energy converter arranged to convert heat obtained from a heat source into induced movement of a work material relative to a surface; and
a second energy converter arranged to generate electrical energy based on the induced movement of the work material relative to the surface;
wherein the second energy converter comprises a coil arrangement arranged to generate the electrical energy based on a changing magnetic field produced by the induced movement of the work material relative to the surface.

21. The energy recycling device of claim 20, wherein the heat source is a source of waste heat.

22. The energy recycling device of claim 20, wherein the first energy converter comprises a Leidenfrost device arranged to induce self-propel movement of the work material relative to the surface.

23. The energy recycling device of claim 20, wherein the second energy converter is further arranged to generate electrical energy based on kinetic energy associated with the induced movement of the work material relative to the surface.

* * * * *